United States Patent [19]

Vomhof et al.

[11] 4,153,208

[45] May 8, 1979

[54] MINCING MACHINE FOR GRINDING UP FOOD

[75] Inventors: Paul Vomhof, Laasphe; Adam Reiss, Breidenstein; Karl-Heinz Schmidt, Steffenberg, all of Fed. Rep. of Germany

[73] Assignee: Kraemer & Grebe GmbH & Co. KG, Lahn, Fed. Rep. of Germany

[21] Appl. No.: 860,599

[22] Filed: Dec. 14, 1977

[30] Foreign Application Priority Data

Dec., 1976 [DE] Fed. Rep. of Germany ....... 2656991

[51] Int. Cl.² ............................................ A47J 43/07
[52] U.S. Cl. .................................. 241/82.4; 241/82.5; 241/82.7
[58] Field of Search ..................... 241/82.1, 82.3, 82.4, 241/82.5, 82.6, 82.7; 425/198, 199; 426/516

[56] References Cited

U.S. PATENT DOCUMENTS

| 431,230 | 7/1890 | Leopold | 241/82.5 |
| 3,934,827 | 1/1976 | Seydelmann | 241/82.3 |
| 4,004,742 | 1/1977 | Hess | 241/82.5 |

Primary Examiner—Howard N. Goldberg
Assistant Examiner—Mark Rosenbaum
Attorney, Agent, or Firm—Blanchard, Flynn, Theil, Boutell & Tanis

[57] ABSTRACT

A cutter set for use in a mincing machine for grinding up of food, particularly meat, cheese and fat. The food is supplied to the cutter set by a conveyor screw. The cutter set consists of at least one rotating knife and at least one perforated disk. The rotating knife has an annular channel around the periphery thereof for facilitating a discharge of hard particles contained in the food. At least a pair of cutting blades is provided on the rotating knife and is connected by a ring having the annular channel therein. At least one of the cutting blades has a radial channel communicating with the annular channel. The channel in the cutting blade is fed from an inlet adjacent the hub thereof. An outlet opening is provided in the housing in which the cutter set is mounted and has a discharge opening communicating with the annular channel for effecting a discharge of the hard particles contained in the food and collected in the annular channel. The ground-up food products, on the other hand, are discharged in a direction parallel to the axis of rotation of the rotating knife.

6 Claims, 5 Drawing Figures

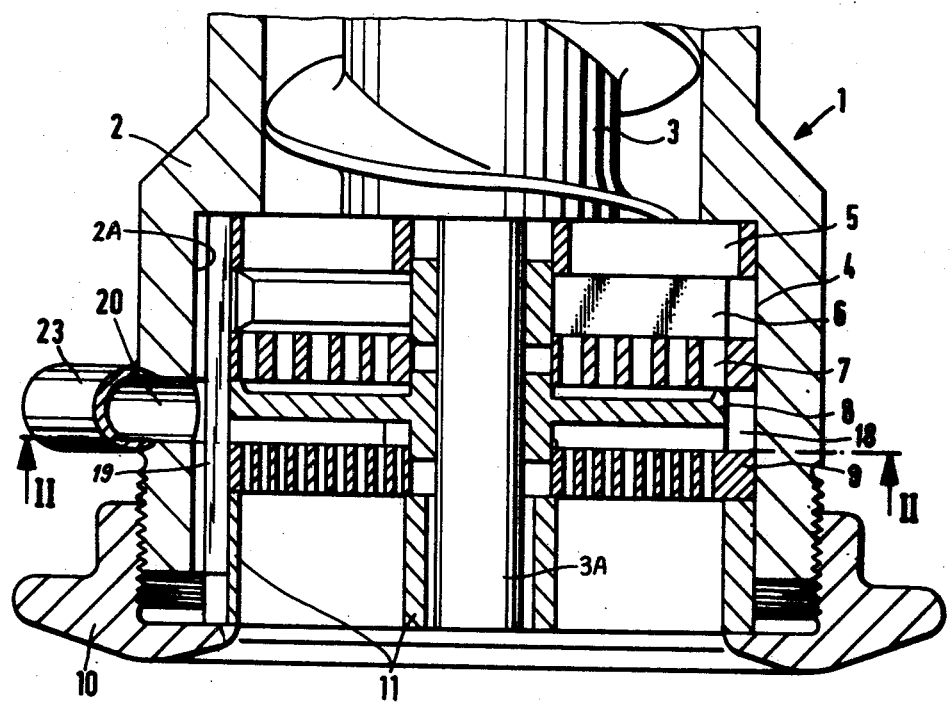

MINCING MACHINE FOR GRINDING UP FOOD

FIELD OF THE INVENTION

The invention relates to a mincing machine for grinding up food, in particular meat, cheese, fat, comprising a housing, which has a feed chute for the food, comprising a drive conveyor screw for feeding the food to a cutter set consisting of at least one rotating knife and at least one perforated disk and a discharge channel for discharging of hard particles contained in the foods.

BACKGROUND OF THE INVENTION

Mincing machines of the above-mentioned type have as a rule a cutter set, which consists of several knives and perforated disks. The food which must be ground up is guided from a screw toward the rotating knives, which each cooperate with a stationary perforated disk connected at the outlet side. Viewed in flow direction of the food which must be ground up, the holes in the perforated disks become smaller. In particular in grinding up meat, it has been proven that hard particles, like bone splinters, cartilage, tendons, etc., will not pass or only with great difficulty will pass through perforated disks having small openings therein and that these accumulate in the center in front of the perforated disks. With a continued uninterrupted operation of the mincing machine, these hard particles always accumulate in front of the perforated disks, so that the output becomes less and less and finally stops.

It is known from German OS No. 2 154 353 to guide these hard particles which accumulate in the area of the hub through a channel, arranged in the hub and which is constructed as a helical groove, to the outside. These hard parts are discharged through a closeable outlet pipe arranged in an extension of the hub. The advantage consists in that during a continuous operation, a plugging up of the mincing machine is less likely and the quality of the processed food is better. However, the disadvantage of this known arrangement is that these channels are only suited to discharge a small waste of hard particles, because they would otherwise plug up. Moreover, the discharge of the hard particles is problematic and complicated.

The basic purpose of the invention is to construct a mincing machine of the above-mentioned type in such a manner that the accumulating hard particles are removed automatically even in larger amounts and the mincing machine becomes only insignificantly more expensive in the manufacture.

This purpose is attained inventively by the knife consisting at least of two knife blades, which are connected by a rotating ring, by a channel for discharging the hard particles being embedded in at least one knife blade, which channel has an outlet opening toward the outside of the ring, and the inlet opening of which is arranged in the area of the hub, and by a ring channel having a discharge opening being constructed between the outer surface of the ring and inner wall of the housing of the mincing machine, which ring channel is divided below the discharge opening through a block member viewed in direction of rotation of the knives.

The discharge of the hard particles is done thus through channels formed into the knife blades, which channels are connected to a ring channel formed between the housing wall and the ring of the knife. The lateral limitation of the ring channel occurs through the perforated disks which are connected in front of and after the knives. The ring channel may be of any desired size, so that any desired amounts of hard particles can be discharged through same. The hard particles are fed into the channels arranged in the knife blades through openings, which lie either in the direction of rotation or in opposite direction. The channels embedded in the knife blades may have a cross section, which is sufficient to accommodate any amount of hard particles.

The outer surface of the ring is advantageously knurled so that the material which is in the ring channel is driven by the rotating ring of the knife and is urged out through the discharge opening.

BRIEF DESCRIPTION OF THE DRAWINGS

One exemplary embodiment of the invention will be described more in detail hereinafter with reference to the drawings, in which.

DETAILED DESCRIPTION

Figure 1:
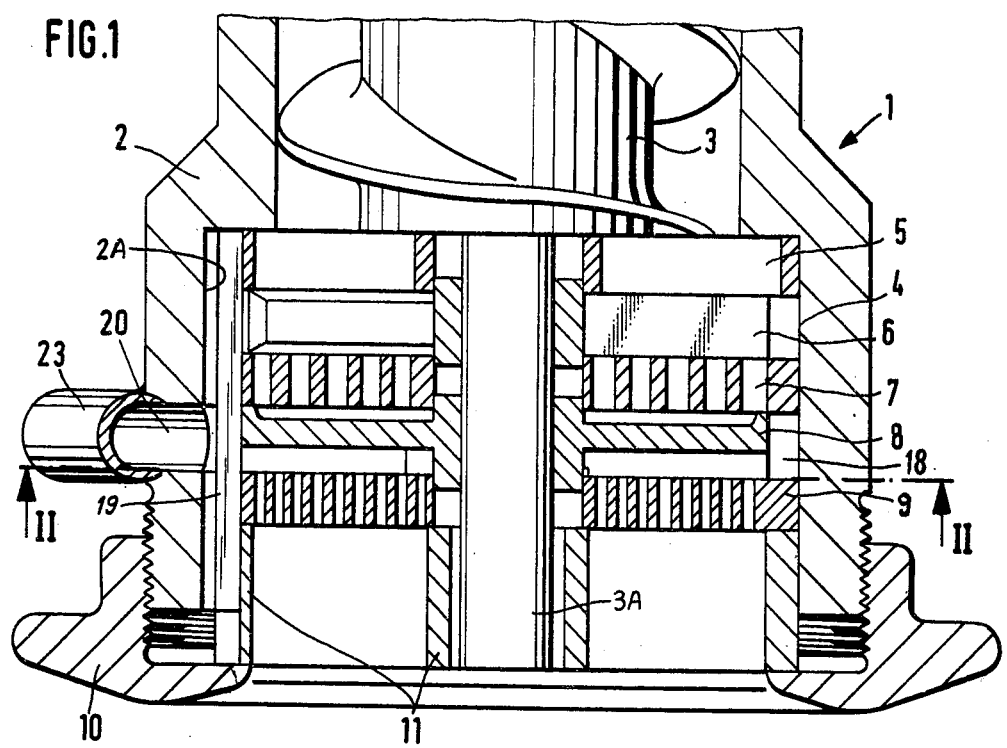
FIG. 1 is a horizontal cross-sectional view of the front end of an inventive mincing machine having a screw and cutter set.
Figure 3:
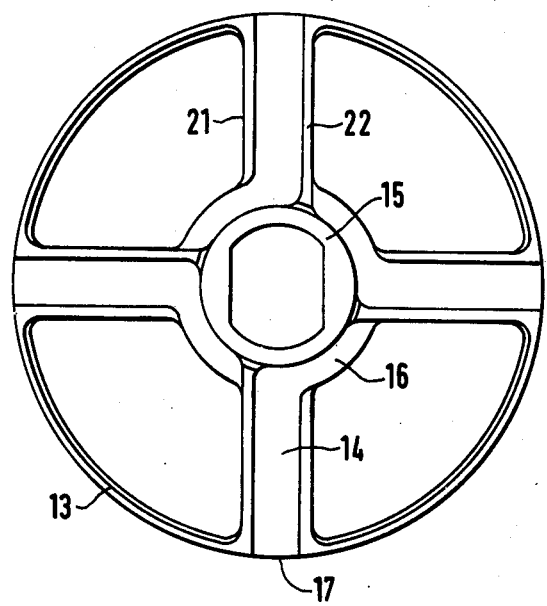
FIGS. 3 and 4 are each a front and rear view, respectively, of an inventively constructed knife.
Figure 4:
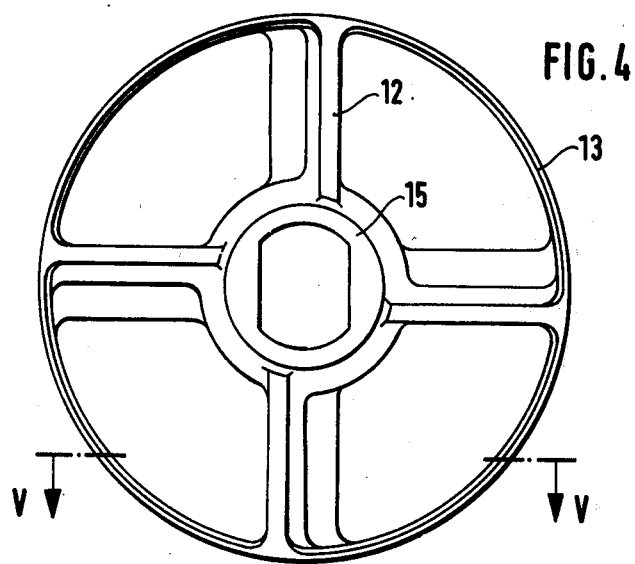
Figure 5:
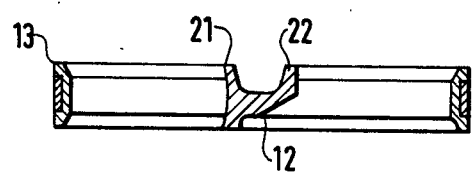
FIG. 5 is a cross-sectional view taken along the line V—V of FIG. 4.

FIG. 1 illustrates the front end of a mincing machine identified as a whole by the reference numeral 1. A driven screw 3 is rotatably supported in the housing 2 and moves the material, which is not illustrated in detail and which is to be ground up, to a set of cutters which is identified by the reference numeral 4. FIG. 1 shows a vertically staked arrangement of cutters 4. It is to be understood that the arrangement can be oriented in any manner and the specific illustration and description is not to be limiting. In addition, the flow of material is from top to bottom in FIG. 1 or from the "front" of the set of cutters 4 to the "rear" side thereof. Starting with the upper cutter, the set of cutters 4, consists of a precutter blade 5 abutting against the screw 3, a first knife 6, a first perforated disk 7 connected therebelow, a further knife 8, which is illustrated in FIGS. 3 to 5 in a front and rear view and also in a cross-sectional view, and a second perforated disk 9 which is connected below the aforesaid knife 8. To secure the set of cutters 4 in the recess 2A in the front housing part 2, an internally threaded nut 10 is screwed onto external threads on the housing to clamp the set of cutters through a support ring 11 between the support ring 11 and the end of the screw 3. Each of the knives 6 and 8 are fixedly connected to and rotatably driven by the extension shaft 3A of the screw 3 by any convenient and, therefore, not illustrated means, such as a setscrew.

The precutter 5, the perforated disks 7 and 9 and the support ring 11 are stationarily connected to the housing 2 of the mincing machine by a block member 19. The block member 19 is received in a recess of the housing and also aligned recesses in the parts 5, 7, 9 and 11. The further function of the block member 19 will be discussed below.

Figure 2:
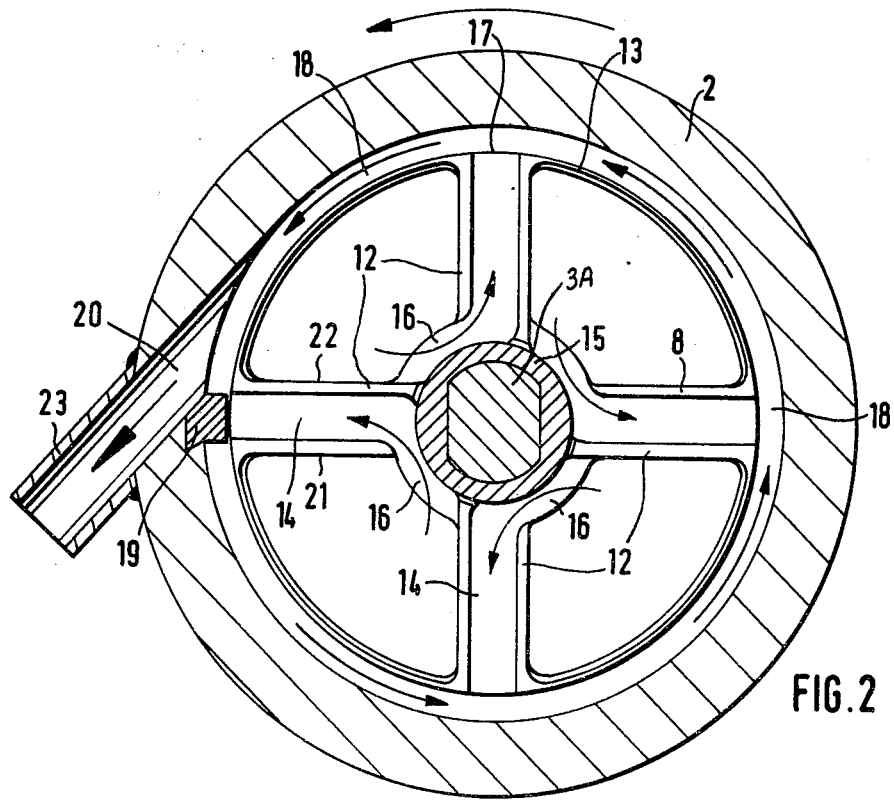
FIG. 2 is a cross-sectional view taken along the line II—II of FIG. 1.

FIG. 2, which illustrates a cross section of FIG. 1, shows an axial face of the knife 8. The knife consists of four blades 12 connected with one another through a hub 15 and a peripheral ring 13. Each of the knife blades 12 has a channel 14 therein. An inlet opening 16 in the knife blade 12 is provided for the hard particles and is located adjacent the hub 15. An outlet opening 17 terminates in an annular channel 18 formed by the outer wall of the ring 13 and the inner wall of the housing 2. The annular channel 18 is divided into two parts by the block member 19. The block member 19 is arranged, viewed in direction of rotation of the knife, below a discharge opening 20 for discharging the hard particles from the annular channel 18. The block member 19 assures that the hard particles which come into the annular channel 18 through the channels 14 are discharged through the discharge opening 20. The surface of the ring 13 is advantageously knurled, so that the hard particles which are in the annular channel 18 are driven by the ring 13 and are moved to the discharge opening.

The channel in the knife blade 12 is defined laterally by the front and the rear cutting edge 21, 22 and is limited forwardly by the perforated disk 9. The cutting edges pass directly by the perforated disk 9. In the illustrated exemplary embodiment, the inlet openings are arranged on the lower or leading cutting edge adjacent the hub. The inlet openings can, however, also be arranged adjacent the rear or trailing cutting edge.

The discharge opening 20 is arranged so that the axis thereof is tangent to the circle defined by the ring channel 18 in the housing, so that the delivered hard mass can be led away without interference. A pipe 23 is welded to the housing to form an extension of the discharge opening 20. The hard particles are discharged through the pipe 23 into a collecting reservoir. Through the lateral arrangement of the discharge for the hard particles, discharge of the processed food from the end of the set of cutters 4 remote from the screw 3 is not affected.

Although a particular preferred embodiment of the invention has been disclosed in detail for illustrative purposes, it will be recognized that variations or modifications of the disclosed apparatus, including the rearrangement of parts, lie within the scope of the present invention.

We claim:

1. In a mincing machine for grinding up of food, in particular meat, cheese, fat, comprising a housing, a driven conveyor screw in said housing for supplying the food to a set of cutters which consists of at least one rotating knife and at least one perforated disk, wherein the improvement comprises said knife consisting of a hub and at least two radially extending cutting blades, which are connected by a peripheral ring, each cutting blade having a channel formed therein for discharging hard particles, which channel has an outlet opening at the outside of the ring and an inlet opening adjacent said hub of the knife, the outer surface of the ring being spaced from the inner wall of the housing to form a ring channel, a discharge opening for said ring channel in said housing, and a block member in said ring channel adjacent said discharge opening.

2. The improved mincing machine according to claim 1, wherein said inlet opening for the channel in the knife blade lies on the front side of said blade in relationship to the direction of rotation of the knife.

3. The improved mincing machine according to claim 1, wherein the front surface of said ring channel is formed by said cooperating perforated disk.

4. The improved mincing machine according to claim 3, wherein the blade channel is formed between a front and a rear cutting edge of the knife blade.

5. The improved mincing machine according to claim 1, wherein the outer surface of the ring is roughened or knurled.

6. The improved mincing machine according to claim 1, wherein said discharge opening extends tangentially from the ring channel.

* * * * *